United States Patent
Yotani et al.

[11] Patent Number: 6,053,487
[45] Date of Patent: Apr. 25, 2000

[54] FLUID-FILLED VIBRATION DAMPING DEVICE WHOSE ORIFICE PASSAGE IS COVERED WITH WATER-REPELLENT COATING LAYER

[75] Inventors: Yorishige Yotani, Komaki; Hiroaki Tanahashi, Aichi-ken, both of Japan

[73] Assignee: Tokai Rubber Industries, Ltd., Komaki, Japan

[21] Appl. No.: 09/036,067

[22] Filed: Mar. 6, 1998

[30] Foreign Application Priority Data

Mar. 18, 1997 [JP] Japan ................................ 9-064678

[51] Int. Cl.⁷ ...................................................... F16F 5/00
[52] U.S. Cl. ...................................................... 267/140.11
[58] Field of Search .......................... 267/140.11, 140.12, 267/140.13, 140.14; 138/44, 146, DIG. 3

[56] References Cited

U.S. PATENT DOCUMENTS

| | | | |
|---|---|---|---|
| 4,872,650 | 10/1989 | Tabata et al. | 267/140.1 |
| 4,909,489 | 3/1990 | Doi | 267/140.1 |
| 5,076,403 | 12/1991 | Mitsui | 188/267 |
| 5,145,156 | 9/1992 | Muramatsu et al. | 267/140.14 |
| 5,188,346 | 2/1993 | Hamada et al. | 267/140.12 |
| 5,356,679 | 10/1994 | Houis et al. | 428/35.9 |
| 5,499,799 | 3/1996 | Kojima | 267/140.13 |
| 5,594,479 | 1/1997 | Inoue et al. | 347/45 |
| 5,620,168 | 4/1997 | Ohtake et al. | 267/140.13 |

FOREIGN PATENT DOCUMENTS

| | | |
|---|---|---|
| 57-9340 | 1/1982 | Japan . |
| 61-62633 | 3/1986 | Japan . |
| 61-191543 | 11/1986 | Japan . |
| 61-270533 | 11/1986 | Japan . |
| 4-296237 | 10/1992 | Japan . |
| 8-4826 | 1/1996 | Japan . |

OTHER PUBLICATIONS

Patent Abstracts of Japan vol. 011, No. 347 (M–641), Nov. 13, 1987 & JP 62 127536 A (Bridgestone Corp), Jun. 9, 1987.
Patent Abstracts of Japan vol. 017, No. 379 (M–1447), Jul. 16, 1993 & JP 05 065937 A (Bridgestone Corp), Mar. 19, 1993.
Patent Abstracts of Japan vol. 095, No. 001, Feb. 28, 1995 & JP 06 300372 A (Matsushita Refrig Co Ltd), Oct. 28, 1994.
Patent Abstracts of Japan vol. 095, No. 006, Jul. 31, 1995 & JP 07 061590 A (Toshiba Corp), Mar. 7, 1995.
Patent Abstracts of Japan vol. 097, No. 007, Jul. 31, 1997 & JP 09 079307 A (Bridgestone Corp), Mar. 25, 1997.

*Primary Examiner*—Christopher P. Schwartz
*Assistant Examiner*—Jeffrey Woller
*Attorney, Agent, or Firm*—Wall Marjama Bilinski & Burr

[57] ABSTRACT

A fluid-filled vibration damping device having a plurality of fluid chambers which are filled with a non-compressible fluid, and orifice defining means which has an orifice-defining surface defining an orifice passage through which the fluid is forced to flow, so as to damp input vibrations based on flows of the fluid through the orifice passage, wherein the improvement comprises: a water-repellent coating layer which is formed by a surface treatment and which covers at least a portion of the orifice-defining surface of the orifice defining means.

10 Claims, 3 Drawing Sheets

FLUID-FILLED VIBRATION DAMPING DEVICE WHOSE ORIFICE PASSAGE IS COVERED WITH WATER-REPELLENT COATING LAYER

The present application is based on Japanese Patent Application No. 9-64678 filed Mar. 18, 1997, the content of which is incorporated hereinto by reference.

BACKGROUND OF THE INVENTION

1. Field of the Invention

The present invention relates to a fluid-filled vibration damping device which exhibits a high vibration damping or isolating effect based on flows or resonance of the fluid contained therein. More particularly, the invention is concerned with such a fluid-filled damping device simple in construction and which is capable of exhibiting an excellent vibration damping effect utilizing fluid flows.

2. Discussion of the Related Art

As a vibration damping device, there is known a fluid-filled elastic mount or vibration damper interposed between two members in a vibration system in order to connect these two members or support one of the two members by the other member in a vibration damping manner. Examples of such a fluid-filled vibration damping device are disclosed in JP-A-57-9340, JP-A-61-62633, JP-U-61-191543, JP-A-61-270533, JP-A-4-296237, and JP-A-8-4826. The vibration damping devices disclosed in these publications have a plurality of fluid chambers which are filled with a non-compressible fluid such as water, and an orifice passage. The fluid is forced to flow between the chambers of the original passage, so as to exhibit a vibration damping or isolating effect based on the resonance of the fluid through the orifice passage. In these fluid-filled vibration damping devices, the orifice passage is tuned to a specific frequency range of the vibration to be damped, by suitably determining the cross sectional area of fluid flow and the length of the orifice passage. Thus, these vibration damping devices exhibit an excellent vibration damping effect based on the flows of the fluid through the orifice passage.

In recent years, various attempts have been made to provide a fluid-filled vibration damping device which even further improves vibration damping capability. However, none of these attempts have been successful in providing such a fluid-filled vibration damping device, which also has a simplified structure which is economical to manufacture.

To improve the damping effect based on the flows of the fluid through the orifice passage, it is effective to increase the length of the orifice passage. However, an increase of the length of the orifice passage inevitably requires an increase of the cross sectional area through fluid flow of the orifice passage (i.e., so that the orifice passage remains tuned to the desired frequency range of the vibration to be damped). However, it is not practical to increase the length and cross sectional area of fluid flow through the orifice passage in order to improve the vibration damping effect of the device, since the provision of such an orifice passage requires a large space within the device.

Another method of improving the vibration damping effect of the vibration damping device, attempts to increase an amount of the fluid flow through the orifice passage by positively controlling the pressures of the fluid in the fluid chambers. However, in order to control the fluid pressures, the vibration damping device needs to be equipped with an actuator and a control device for controlling the actuator. This undesirably increases the complexity of the structure of the device and the cost of manufacture.

SUMMARY OF THE INVENTION

It is therefore an object of the present invention to provide a fluid-filled vibration damping device which is simple in construction and which exhibit an improved vibration damping effect based on flows of the fluid contained therein.

The above object may be achieved according to the principle of the present invention which provides a fluid-filled vibration damping device having a plurality of fluid chambers which are filled with a non-compressible fluid, and orifice defining means which has an orifice-defining surface defining an orifice passage through which the fluid is forced to flow, so as to damp input vibrations based on flows of the fluid through the orifice passage, wherein the improvement comprises: a water-repellent coating layer formed by a surface treatment and covering at least a portion of the orifice-defining surface of the orifice defining means.

In the fluid-filled vibration damping device constructed according to the present invention, the resistance to a flow of the fluid through the orifice passage is reduced since at least a portion of the orifice-defining surface of the orifice defining means is covered with the water-repellent coating layer. This arrangement leads to an increase of the amount of the fluid which flows through the orifice passage, so that the present vibration damping device assures an enhanced vibration damping effect based on the flows or resonance of the fluid which functions as a mass.

The present vibration damping device exhibits an improved vibration damping capability with a simplified structure without an increase of the number of the required components and the size of the orifice passage. Thus, the present vibration damping device is excellent in practical use.

The principle of the present invention is applicable to various types of vibration damping devices having an orifice passage, such as those disclosed in JP-A-57-9340 and JP-A-61-62633, wherein a first and a second mounting member are spaced from each other and elastically connected to each other by an elastic body interposed therebetween, and a pressure-receiving chamber partially defined by the elastic body and an equilibrium chamber partially defined by a flexible diaphragm are held in fluid communication with each other through an orifice passage.

The principle of the present invention is also applicable to a fluid-filled bushing or a fluid-filled cylindrical elastic mount. The fluid-filled bushing is disclosed in JP-A-61-270533 and JP-A-8-4826, for instance, wherein an inner metal sleeve and an outer metal sleeve are disposed in radially spaced-apart relationship with each other and are elastically connected to each other by an elastic body interposed in a radial space between the two metal sleeves, and a pair of fluid chambers which are located on the diametrically opposite sides of the inner metal sleeve are held in fluid communication with each other through an orifice passage. The fluid-filled cylindrical elastic mount is disclosed in JP-A-4-296237, for instance, wherein a fluid-tight space is formed between an inner metal sleeve and an outer metal sleeve which are elastically connected to each other by an elastic body, and the fluid-tight space is divided into two sections by a partition plate which protrudes from one of the inner and outer sleeves toward the other of the two sleeves, so as to provide a pair of fluid chambers which are located on the diametrically opposite sides of the partition plate and which are held in fluid communication with each other through an orifice passage.

The present invention is also applicable to an active-type vibration damping device as disclosed in JP-U-61-191543, for instance, which device has an actuator for oscillating a member which partially defines the fluid chamber so as to control the pressure of the fluid in the fluid chamber, so that the flow of the fluid through an orifice passage is controlled.

Further, the present invention is applicable to a passive-type or an active-type vibration damper adapted to absorb or reduce the vibration of an oscillating body, which damper has a mass member elastically attached to the oscillating body via an elastic body so as to constitute a vibration system, and a plurality of fluid chambers communicating with each other through an orifice passage through which the fluid in the fluid chambers is forced to flow by displacement of the mass member.

The coating layer which covers at least a portion of the orifice-defining surface of the orifice defining means may be either metallic or non-metallic, and any known layers may be employed in the present invention provided that the layers are water-repellent. For example, the water-repellent coating layer is formed by using an electrodeposition coating paint, an oil paint, a thermosetting paint, an ultra-violet curable paint, or an electron-beam curable paint. Further, the water-repellent coating layer may be formed by plating such as electroplating or hot dipping.

While the fluid which fills the fluid chambers is suitably selected from among various known non-compressible fluids depending upon the required vibration damping characteristics of the device, it is preferable to select a non-compressible fluid having a low viscosity value of not larger than 0.1 Pa·s, for enabling the vibration damping device to exhibit effective vibration damping characteristics based on the resonance of the fluid.

The configuration of the orifice passage is not particularly limited. However, according to a first preferred form of the present invention, the portion of the orifice-defining surface of the orifice defining means which is covered with the water-repellent coating layer has mean roughness (Rz) of not larger than 25 $\mu$m according to JIS (Japanese Industrial Standard) B-0601.

The fluid-filled vibration damping device according to the first preferred form of the present invention does not suffer from turbulence or irregular flow of the fluid through the orifice passage, which might be otherwise caused by an irregular or rough inner surface of the orifice passage. Accordingly, the resistance to a flow of the fluid through the orifice passage is reduced, so that the amount of the fluid flow through the orifice passage is increased, leading to improvement of the vibration damping effect of the device exhibited based on the flows of the fluid.

The material of the orifice defining means is not particularly limited, but may be selected, for instance, from among a rigid resin material and a metal material which have enough stiffness or rigidity to maintain the configuration of the orifice passage. However, according to a second preferred form of the present invention, the orifice defining means comprises an orifice member which is formed by die casting of an aluminum alloy. The orifice member which is formed by die casting of the aluminum alloy is rigid and light in weight, and has high durability while assuring a high degree of freedom in its design and high efficiency in its manufacture. Thus, the present arrangement provides an excellent orifice defining member while improving the vibration damping capability of the device by increasing the amount of the fluid flow through the orifice passage.

In a third preferred form of the present invention, the vibration damping device further comprises an elastic body which is bonded to the orifice defining means. Generally, in order to assure enough bonding strength between the elastic body and the orifice defining means, it is undesirable to sufficiently smooth the outer surface of the orifice defining means. In the present vibration damping device, however, the water-repellent coating layer need not be formed on the outer surface of the orifice defining means to which the elastic body is bonded. Accordingly, the present vibration damping device assures a sufficiently high bonding strength between the elastic body and the orifice defining means, and at the same time has an improved vibration damping capability owing to an increase of the amount of the fluid flow through the orifice passage, because the resistance to a flow of the fluid is reduced by the water-repellent coating layer provided on at least a portion of the orifice-defining surface of the orifice defining means, e.g., on the inner surface of an orifice groove formed in the outer surface of an orifice member. The structure and material of the elastic body bonded to the orifice defining means are not specifically limited. For instance, the elastic body may be a rubber body which partially defines at least one of the fluid chambers and to which the vibrational load is applied, or a rubber partition member which divides a fluid-tight space within the device into a plurality of fluid chambers.

The configuration of the orifice passage is not particularly limited. For instance, the orifice passage may be in the form of a through-hole which extends through the thickness of the orifice defining means. Alternatively, the orifice passage may be formed between a plurality of orifice plates superposed on one another. However, according to a fourth preferred form of the present invention, the orifice defining means comprises an orifice member having a groove and another member which closes the groove and which cooperates with the orifice member to define the orifice passage. In this case, the inner surface of the groove which partially defines the orifice passage is entirely covered with the water-repellent coating layer.

In the fluid-filled vibration damping device according to the above fourth preferred form of the present invention, the orifice passage having a complicated configuration can be easily formed with a reduced number of the required members. In the present arrangement, the orifice passage may be partially defined by the groove which is formed in the outer circumferential surface of the orifice member so as to extend in its circumferential direction, so that the orifice passage has a sufficient length, without an increase in the installation space required for the orifice defining means.

In the fluid-filled vibration damping device described above, it is preferable that the entire area of the orifice-defining surface of the orifice defining means be covered with the water-repellent coating layer. However, the advantages of the present invention can be obtained if at least a portion of the orifice-defining surface of the orifice defining means is covered with the water-repellent coating layer. For the vibration damping device to exhibit a sufficiently improved vibration damping effect, the orifice-defining surface of the orifice defining means is preferably covered with the water-repellent coating layer over a surface area which is larger than one half of its entire area. More preferably, the orifice-defining surface of the orifice defining means is covered with the water-repellent layer over a surface area which is larger than three-quarters of its entire area.

BRIEF DESCRIPTION OF THE DRAWINGS

The above and optional objects, features, advantages and technical significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
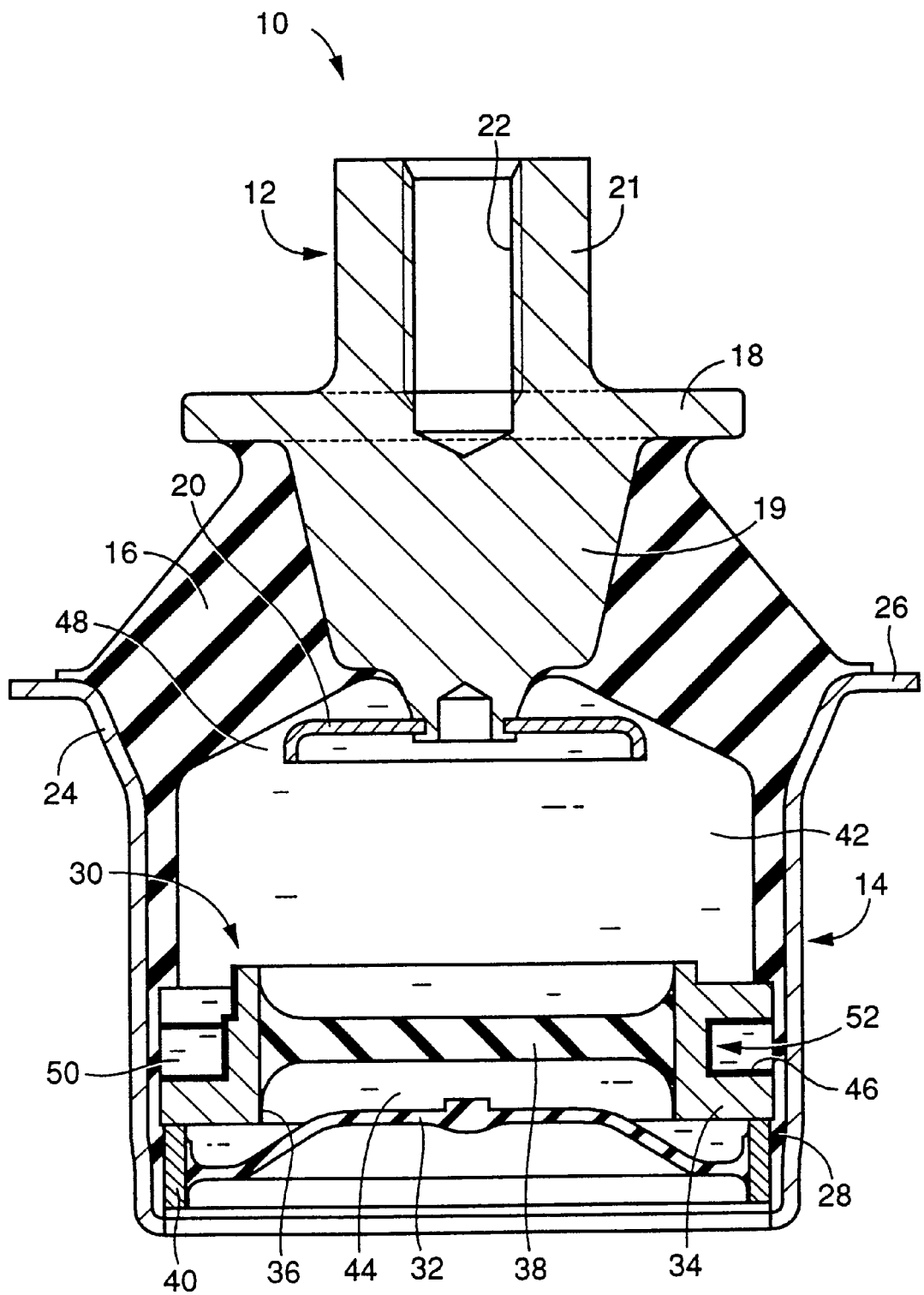
FIG. 1 is an elevational view in axial or vertical cross section of a fluid-filled vibration damping device in the form of an engine mount constructed according to one embodiment of the present invention.

Referring first to FIG. 1, there is shown an engine mount 10 for use on a motor vehicle, as one embodiment of the fluid-filled vibration damping device of the present invention. This engine mount 10 includes a first mounting member 12 and a second mounting member 14 which are both made of metallic materials and which are disposed in mutually opposed and spaced-apart relationship with each other. The first and second mounting members 12, 14 are elastically connected to each other by an elastic body 16 made of a rubber material. The first and second mounting members 12, 14 are attached to a power unit and a body of the motor vehicle, respectively, so that the power unit is mounted on the vehicle body via the engine mount 10 in a vibration damping fashion. With this engine mount 10 installed on the vehicle as described above, the elastic body 16 is elastically deformed with a static load or weight of the power unit acting thereon. The engine mount 10 is installed so as to damp and isolate input vibrations which are applied in the direction in which the first and second mounting members 12, 14 are opposed to each other, namely, in the vertical direction as seen in FIG. 1. (This direction is referred to as "a load-receiving direction".)

The first mounting member 12 consists of: an axially lower portion 19 having an inverted generally frusto-conical shape whose diameter decreases in an axially downward direction as seen in FIG. 1; an annular plate portion 18 which is formed integrally with the axially lower portion 19 at its large-diameter end, so as to extend radially outwardly of the large-diameter end of the axially lower portion 19 by a suitable radial distance; and an axially upper portion 21 which extends axially upwardly from the large-diameter end of the axially lower portion 19. The axially upper portion 21 has a threaded hole 22 which is open in the top face thereof and extends in the axial direction toward the large-diameter end of the axially lower portion 19. The first mounting member 12 is attached to the power unit by a bolt which is screwed in the threaded hole 22. To the small-diameter end of the axially lower portion 19, there is secured by caulking an inverted cup-shaped resonance member 20 which has a generally circular shape and extends from the small-diameter end of the axially lower portion 19 in the radial direction of the engine mount 10.

The second mounting member 14 is a generally cylindrical member with a relatively large diameter, and is disposed coaxially with the first mounting member 12 such that the second mounting member 14 is axially spaced apart from the first mounting member 12 by a suitable distance. The second mounting member 14 includes a tapered upper end portion 24 which is open upwards. This tapered upper end portion 24 is provided with an integrally formed outer flange 26, which extends radially outwardly from the upper end of the tapered upper end portion 24. The second mounting member 14 is positioned relative to the first mounting member 12 such that the inner circumferential surface of the tapered upper end portion 24 of the second mounting member 14 is opposed to the outer circumferential surface of the axially lower portion 19 of the first mounting member 12, such that these inner and outer circumferential surfaces are spaced from each other by an elastic body interposed therebetween.

The elastic body 16 has a generally frusto-conical shape. The first mounting member 12 and the elastic body 16 are bonded together by vulcanizing a rubber material for forming the elastic body 16 such that the axially lower portion 19 of the first mounting member 12 is embedded in the small-diameter end portion of the elastic body 16. The tapered upper end portion 24 of the second mounting member 14 is bonded to the outer circumferential surface of the large-diameter end portion of the elastic body 16 using the above-described process of vulcanization. Thus, the first and second mounting members 12, 14 are elastically connected to each other through the elastic body 16. The inner circumferential surface of the second mounting member 14 is entirely covered by a sealing rubber layer 28.

Figure 2:
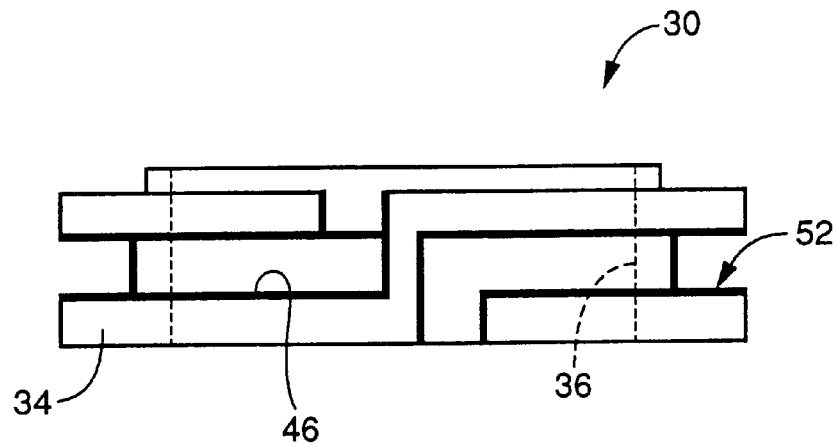
FIG. 2 is a front elevational view of a partition member provided in the engine mount of FIG. 1.
Figure 3:
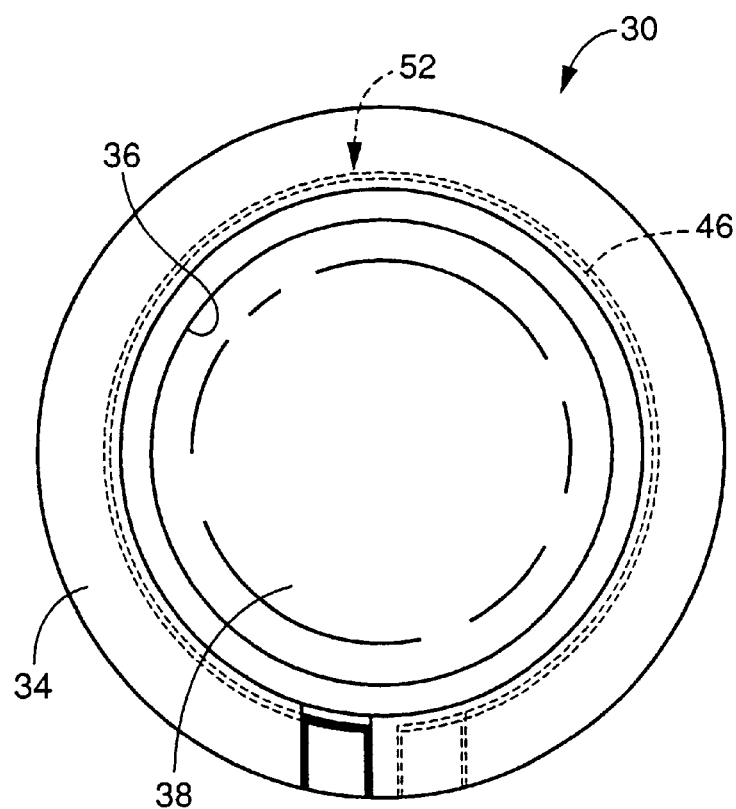
FIG. 3 is a plan view of the partition member of FIG. 2.

In the axially lower end portion of the second mounting member 14, there are accommodated a partition member 30 and a flexible diaphragm 32. The partition member 30 includes an annular orifice member 34 and a circular rubber plate 38 which is fitted in a central hole 36 formed through the orifice member 34, as shown in FIGS. 2 and 3. The rubber plate 38 is bonded by vulcanization at its outer circumferential surface, to the inner circumferential surface of the orifice member 34 which defines the central hole 36, so as to fluid-tightly close the central hole 36. The flexible diaphragm 32 is a relatively thin-walled circular rubber film. To the outer circumferential surface of the flexible diaphragm 32, a fitting ring 40 is bonded by vulcanization. The orifice member 34 and the fitting ring 40 are fixedly secured to the second mounting member 14 such that the partition member 30 is superposed on the fitting ring 40 and such that the diaphragm 32 is fitted in the axially lower open end portion of the second mounting member 14. The axially lower open end portion of the second mounting member 14 is subjected to a suitable drawing operation so that the fitting ring 40 is firmly fitted in the inner circumferential surface of the second mounting member 14 via the sealing layer 28. The sealing rubber layer 28 is sandwiched by and between the outer circumferential surfaces of the partition member 30 and the fitting ring 40, and the inner circumferential surface of the second mounting member 14, so as to assure fluid-tightness therebetween.

In the thus constructed engine mount 10, the axially lower open end of the second mounting member 14 is fluid-tightly closed by the flexible diaphragm 32, so that the second mounting member 14 and the flexible diaphragm 32 cooperate with the elastic body 16 to define a fluid-tightly enclosed space within the second mounting member 14 filled with a non-compressible fluid. The fluid-tightly enclosed space within the second mounting member 14 is divided by the partition member 30 into two sections located on the axially opposite sides of the partition member 30. A pressure-receiving chamber 42 is partially defined by the elastic body 16, and an equilibrium chamber 44 is partially defined by the flexible diaphragm 32. Upon application of a vibrational load to the engine mount 10, the pressure of the fluid in the pressure-receiving chamber 42 changes due to elastic deformation of the elastic body 16, while the volume of the equilibrium chamber 44 is easily variable by elastic deformation or displacement of the diaphragm 32. For effective damping of the input vibrations based on flows or resonance of the fluid, these pressure-receiving and equilibrium chambers 42, 44 are filled with a low-viscosity fluid such as water, alkylene glycol, polyalkylene glycol or silicone oil, whose viscosity is not higher than 0.1 Pa·s.

The rubber plate 38 which is disposed in the central hole 36 of the orifice member 34 partially defines the pressure-receiving chamber 42 and the equilibrium chamber 44. This rubber plate 38 is elastically deformed upon a small periodic change of the fluid pressure in the pressure-receiving chamber 42, so that the small periodic pressure change is transferred to and absorbed by the equilibrium chamber 44. Accordingly, the present engine mount 10 is capable of exhibiting a high damping effect with respect to medium-frequency vibrations such as engine idling vibrations applied to the engine mount while the vehicle is in a stop with the engine idling.

The inverted cup-shaped resonance member 20 which is caulked to the small-diameter end of the axially lower portion 19 of the first mounting member 12 is disposed within the pressure-receiving chamber 42. The periphery of the resonance member 20 cooperates with the corresponding inner wall surface of of the elastic body 16 (which partially defines the pressure-receiving chamber 42) to define an annular restricted fluid passage 48. Upon application of a high-frequency vibrational load to the engine mount 10, the resonance member 20 is oscillatingly displaced in the load-receiving direction, so that the fluid in the pressure-receiving chamber 42 is caused to flow through the restricted passage 48. In the present embodiment, the restricted passage 48 is tuned to isolate booming noise and other high-frequency vibrations, based on resonance of the fluid flowing therethrough.

The orifice member 34, which is interposed between the pressure-receiving chamber 42 and the equilibrium chamber 44, is formed with a groove 46 in its outer circumferential surface over a length which is slightly smaller than its outer circumference. The opposite ends of the groove 46 are open in the axially upper and lower surfaces of the orifice member 34, respectively. With the orifice member 34 fitted in the axially lower end portion of the second mounting member 14, the groove 46 is closed by the second mounting member 14 via the sealing rubber layer 28. As a result, the orifice member 34 and the second mounting member 14 cooperate to define an orifice passage 50 which extends in the circumferential direction over a circumferential length which is slightly smaller than the outer circumference of the orifice member 34. The orifice passage 50 communicates at one end thereof with the pressure-receiving chamber 42, and at the other end with the equilibrium chamber 44. The non-compressible fluid is forced to flow between the pressure-receiving and equilibrium chambers 42, 44 through the orifice passage 50 due to a pressure difference between the two chambers 42, 44 upon application of a vibrational load to the engine mount 10. In the present embodiment, the length and cross sectional area of fluid flow of the orifice passage 50 are tuned or determined so as to provide a high damping effect with respect to engine shakes and other low-frequency vibrations based on resonance of the fluid flow through the orifice passage 50. This tuning of the orifice passage 50 is effected while taking account of the stiffness values of the elastic body 16, flexible diaphragm 32, and rubber plate 38 which partially define the pressure-receiving and equilibrium chambers 42, 44 and the viscosity of the fluid contained in the two chambers 42, 44.

The method and material for forming the orifice member 34 are not particularly limited. In the present embodiment, however, the orifice member 34 is formed by die casting using a metallic material such as an aluminum alloy. The orifice member 34 is subjected to a surface-roughening treatment such as sand blasting, as needed, at least at its inner circumferential surface which defines the central hole 36, to thereby increase the bonding strength of the rubber plate 38 with respect to the inner circumferential surface of the orifice member 34.

The surface of the groove 46 formed in the orifice member 34 is entirely covered with a water-repellent coating layer 52. This water-repellent coating layer 52 may be either metallic or non-metallic, provided that the coating layer 52 is repellent to water. However, the material for the water-repellent coating layer 52 should be suitably selected, while taking account of its ease and cost of manufacture, so that the obtained coating layer 52 exhibits a high corrosion resistance to the fluid in the fluid chambers, and so that the obtained coating layer 52 is not easily removed due to separation from the surface of the orifice member 34. In the present invention, the material for the water-repellent coating layer 52 is selected so that the obtained coating layer 52 also exhibits a high heat resistance. It is preferable that the water-repellent coating layer 52 in the present invention be formed by baking finish, cationic electrodeposition using an epoxy resin paint, or galvanization, for instance.

In a preferred form of the present embodiment, the inner surface of the groove 46 is subjected to a surface smoothening treatment, as needed, rather than the surface-roughening treatment as described above. As a result, the inner surface of the groove 46 has mean roughness (Rz) of not larger than 25 μm (Rz: mean roughness as specified in JIS B 0601), prior to the formation of the water-repellent coating layer 52 thereon. According to this arrangement, the inner surface of the groove 46, i.e., a portion of the inner surface of the orifice passage 50 which is covered with the water-repellent coating layer 52 is highly smooth.

In the present embodiment, the inner surface of the groove 46 and the sealing rubber layer 28 cooperate with each other to constitute an orifice-defining surface which defines the orifice passage 50. About three-quarters of the entire area of the orifice-defining surface is provided by the water-repellent coating layer 52, which is formed on the inner surface of the groove 46, while the rest (one-quarter) of the area of the orifice-defining surface is provided by the sealing rubber layer 28. According to this arrangement, a substantial portion of the inner surface of the orifice passage 50 is covered with the water-repellent layer 52, to thereby reduce the resistance encountered by the fluid flowing through the orifice passage 50. Accordingly, the present engine mount 10 exhibits a significantly enhanced vibration damping effect due to the resonance of the fluid flowing through the orifice passage 50.

Figure 4:
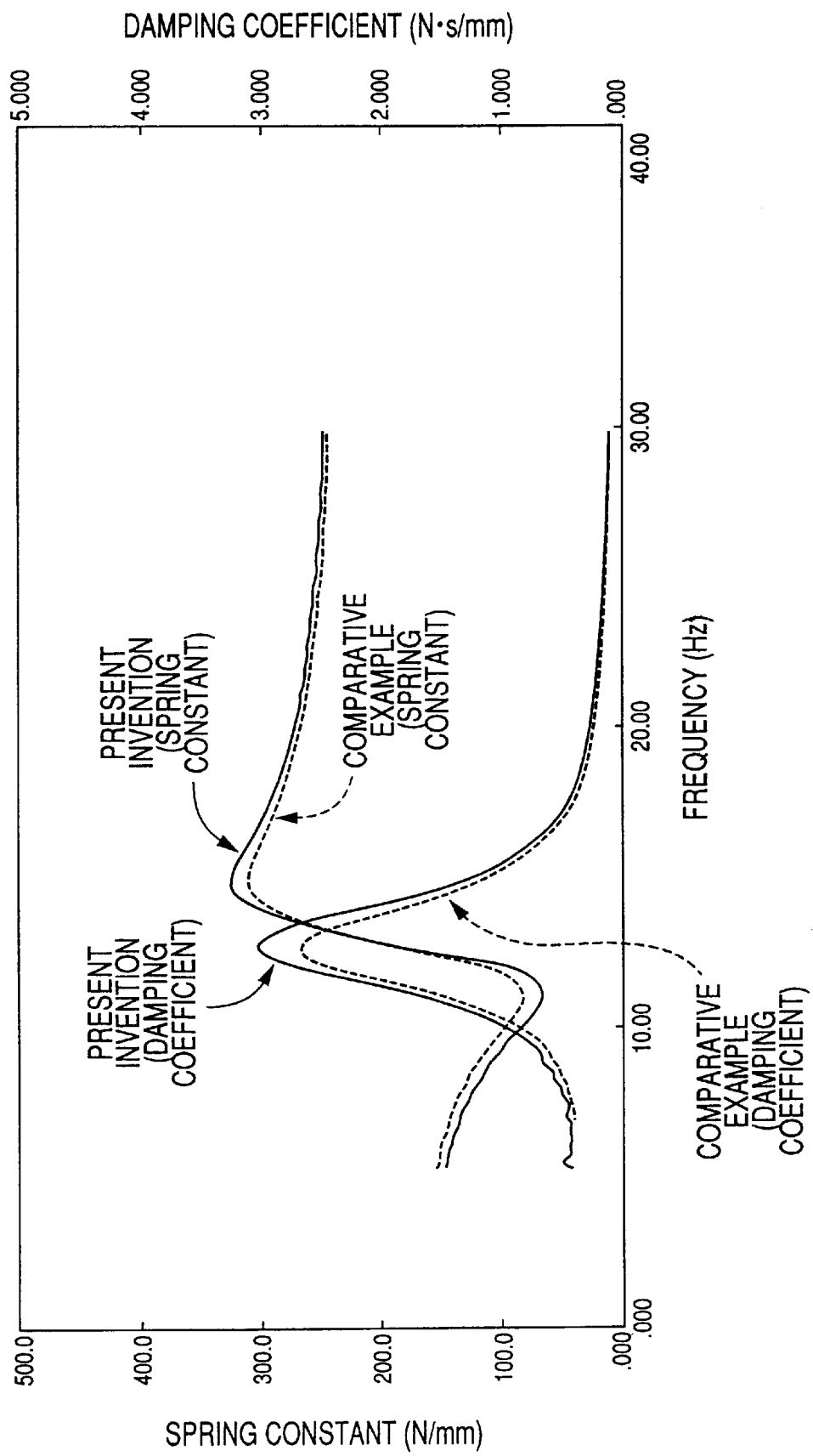
FIG. 4 is a graph showing the damping characteristics measured of the engine mount of FIG. 1 and in an engine mount according to a comparative example.

In the engine mount constructed according to the present embodiment, the frequency characteristics in terms of the dynamic spring constant and the damping coefficient were measured. The results of the measurement are indicated in the graph of FIG. 4. The orifice member 34 of the engine mount 10 used in this test is formed by die casting using an aluminum alloy, and the groove 46 which partially defines the orifice passage 50 is subjected to baking of epoxy resin so as to cover the inner surface of the groove 46 with the water-repellent coating layer 52. In measuring the dynamic spring constant and the damping coefficient of the engine mount 10, there was applied an initial load of 75.50 kgf which is equivalent to the weight of the power unit, between the first and second mounting members 12, 14. In this state, the engine mount 10 was subjected to vibration having an amplitude of 0.10 mm. The dynamic spring constant and the damping coefficient were measured of a comparative engine mount having a structure similar to that of the present engine mount, except that the water-repellent coating layer 52 was not formed on the surface of the groove 46. The results are also indicated in FIG. 4.

It will be understood from the results shown in FIG. 4 that the present engine mount exhibited an improved vibration damping effect based on the resonance of the fluid flow through the orifice passage 50 whose inner surface is substantially covered with the water-repellent coating layer 52.

The engine mount 10 constructed according to the present embodiment exhibits an enhanced vibration damping capability by simply forming the water-repellent coating layer 52 on the inner surface of the groove 46 of the orifice member 34, without adversely influencing the vibration damping characteristics of the engine mount. Namely, according to the present embodiment, an engine mount which is simple in construction and which is capable of exhibiting an excellent vibration damping capability can be manufactured with high production efficiency and reduced cost.

While the present invention has been described in its presently preferred embodiment, it is to be understood that the invention is not limited to the details of the illustrated embodiment, but may be otherwise modified.

For instance, the rubber plate 38 may be replaced by a rigid member which is integrally formed with the partition member 30.

The partition member 30 may consist of a pair of metal plates superposed on each other, and a movable plate which is interposed between the metal plates, such that the movable plate is displaceable by a relatively small axial distance between the metal plates, as shown in JP-A-57-9340. When an orifice passage is formed between the contacting surfaces of the pair of metal plates as disclosed in the above-identified publication, the surfaces of the metal plates which define the orifice passage are covered with a water-repellent coating layer. In this case, the entire surface areas of the metal plates which define the orifice passage can be covered with the water-repellent coating layer.

While the fluid-filled vibration damping device in the form of the engine mount 10 for motor vehicles has been described above, the principle of the present invention is also applicable to other types of fluid-filled vibration damping device having an orifice passage, such as a body mount, a differential mount and a suspension bushing used for motor vehicles, and fluid-filled vibration damping devices used for equipment or devices other than a motor vehicle.

It is to be understood that the present invention may be embodied with various changes, modifications and improvements, which may occur to those skilled in the art, without departing from the spirit and scope of the present invention defined in the attached claims.

What is claimed is:

1. A fluid-filled vibration damping device having a plurality of fluid chambers which are filled with a non-compressible fluid, and orifice defining means which has an orifice-defining surface defining an orifice passage through which said fluid is forced to flow, so as to damp input vibrations based on flows of said fluid through said orifice passage, wherein the improvement comprises: a water-repellent coating layer formed by a surface treatment on at least a portion of said orifice-defining surface, to thereby reduce a resistance to a flow of said fluid which flows through said orifice passage, so that said vibration damping device exhibits an enhanced vibration damping effect based on the resonance of said fluid which flows through said orifice passage.

2. A fluid-filled vibration damping device according to claim 1, wherein said portion of said orifice-defining surface of said orifice defining means which is covered with said water-repellent coating layer has a mean surface roughness of not larger than 25 μm to reduce the resistance encountered by said fluid flowing through said orifice passage and thereby increase the amount of fluid flowing through said orifice passage and improve the vibration damping effect of the device.

3. A fluid-filled vibration damping device according to claim 1, wherein said portion of said orifice-defining surface of said orifice defining means which is covered with said water-repellent coating layer is larger than one half of an entire area of said orifice-defining surface.

4. A fluid-filled vibration damping device according to claim 1, wherein said portion of said orifice-defining surface of said orifice defining means which is covered with said water-repellent coating layer is larger than three-quarters of an entire area of said orifice-defining surface.

5. A fluid-filled vibration damping device according to claim 1, wherein said orifice defining means comprises an orifice member which is formed by die casting of an aluminum alloy.

6. A fluid-filled vibration damping device according to claim 1, further comprising an elastic body which is bonded to said orifice defining means.

7. A fluid-filled vibration damping device according to claim 1, wherein said orifice defining means comprises an orifice member having a groove, and another member which closes said groove and which cooperates with said orifice member to define said orifice passage, an entire surface of said groove which partially defines said orifice passage being covered with said water-repellent coating layer.

8. A fluid-filled vibration damping device according to claim 1, wherein said water-repellent coating layer is formed by using a paint selected from the group consisting of an electrodeposition coating paint, an oil paint, a thermosetting paint, an ultra-violet curable paint and an electron-beam curable paint.

9. A fluid-filled vibration damping device according to claim 1, wherein said water-repellent coating layer is formed by electroplating.

10. A fluid-filled vibration damping device according to claim 1, wherein said water-repellent coating layer is formed by hot dipping.

* * * * *